United States Patent
Coulombe et al.

(10) Patent No.: US 9,060,248 B1
(45) Date of Patent: Jun. 16, 2015

(54) DYNAMIC PLACING AND UPDATING OF A GEOFENCE FOR A MOBILE BUSINESS

(71) Applicant: INTUIT INC., Mountain View, CA (US)

(72) Inventors: Gregory K. Coulombe, Sherwood Park (CA); Horace Chan, Edmonton (CA); Daniel L. Moise, Edmonton (CA); Richard J. Becker, St. Albert (CA)

(73) Assignee: INTUIT INC., Mountain View, CA (US)

( * ) Notice: Subject to any disclaimer, the term of this patent is extended or adjusted under 35 U.S.C. 154(b) by 119 days.

(21) Appl. No.: 13/831,505

(22) Filed: Mar. 14, 2013

Related U.S. Application Data

(60) Provisional application No. 61/762,809, filed on Feb. 8, 2013.

(51) Int. Cl.
*H04W 4/02* (2009.01)

(52) U.S. Cl.
CPC .................... *H04W 4/021* (2013.01)

(58) Field of Classification Search
CPC ..... H04W 76/007; H04W 4/22; H04W 64/00; H04W 4/02
USPC .............. 455/404.2, 456.1, 456.3, 9; 370/252
See application file for complete search history.

(56) References Cited

U.S. PATENT DOCUMENTS

| | | | |
|---|---|---|---|
| 2013/0091452 A1* | 4/2013 | Sorden et al. .................. | 715/771 |
| 2014/0066090 A1* | 3/2014 | Henderson .................. | 455/456.1 |
| 2014/0155094 A1* | 6/2014 | Zises .......................... | 455/456.3 |
| 2014/0162692 A1* | 6/2014 | Li et al. ...................... | 455/456.3 |
| 2014/0164118 A1* | 6/2014 | Polachi ....................... | 705/14.57 |

* cited by examiner

*Primary Examiner* — Cong Tran
(74) *Attorney, Agent, or Firm* — Park, Vaughan, Fleming & Dowler LLP

(57) ABSTRACT

The disclosed embodiments provide a system that dynamically updates a geofence of a mobile business. During operation, the system establishes a first location and a first geofence for the mobile business. Next, the system receives a second location of the mobile business different than the first location of the mobile business. The system then generates an updated geofence for the mobile business based on the second location of the mobile business. The system subsequently broadcasts the second location of the mobile business to a set of mobile clients monitoring the mobile business.

23 Claims, 4 Drawing Sheets

US 9,060,248 B1

DYNAMIC PLACING AND UPDATING OF A GEOFENCE FOR A MOBILE BUSINESS

RELATED APPLICATION

This application hereby claims priority under 35 U.S.C. §119 to U.S. Provisional Application No. 61/762,809, entitled "DYNAMIC PLACING AND UPDATING GEOFENCE FOR A MOBILE BUSINESS," by inventors Gregory K. Coulombe et al. filed on 8 Feb. 2013.

BACKGROUND

Related Art

The disclosed embodiments relate to systems for providing location-based services to mobile devices. More specifically, the disclosed embodiments relate to techniques for dynamically updating a geofence of a mobile business to reflect changes in the location of the mobile business.

SUMMARY

The disclosed embodiments provide a system that dynamically updates a geofence for a mobile business. During operation, the system establishes a first location and a first geofence for the mobile business. Next, the system receives a second location of the mobile business different than the first location of the mobile business. The system then generates an updated geofence for the mobile business based on the second location of the mobile business. The system subsequently broadcasts the second location of the mobile business to a set of mobile clients monitoring the mobile business.

In some embodiments, the system also predicts an estimated time of arrival (ETA) of the mobile business at a third location based at least on the second location. Next, the system notifies the set of mobile clients of the ETA of the mobile business at the third location.

In some embodiments, the system predicts the ETA of the mobile business at the third location by determining a velocity of the mobile business based at least on the second location. The system can predicts the ETA of the mobile business at the third location by determining a pattern of movement of the mobile business based at least on the second location.

In some embodiments, the system alerts a mobile client when the mobile client enters the updated geofence of the mobile business.

In some embodiments, prior to establishing the first location and the first geofence, the system registers the mobile business.

In some embodiments, the system registers the mobile business by using either a business-side mobile application or a business-side web application.

In some embodiments, the system alerts the mobile business when a mobile client enters the updated geofence.

In some embodiments, the system predicts a path of the mobile business based at least on the first location and the second location.

The disclosed embodiments also provide a system that dynamically updates a geofence of a mobile business to a server. During operation, the system registers with the server by sending a first location of the mobile business to the server, wherein the first location is used to determine a first geofence for the mobile business. Next, the system detects a change of location of the mobile business from the first location to a second location. The system then sends the second location of the mobile business to the server, which is used to determine an updated geofence for the mobile business from the first geofence. The system may also send attribute information associated with the second location to the server.

In some embodiments, the system receives notification from the server of the present of one or more mobile clients within the updated geofence.

In some embodiments, the system receives notification from the server when a mobile client enters the updated geofence.

BRIEF DESCRIPTION OF THE FIGURES

In the figures, like reference numerals refer to the same figure elements.

DETAILED DESCRIPTION

Figure 1:
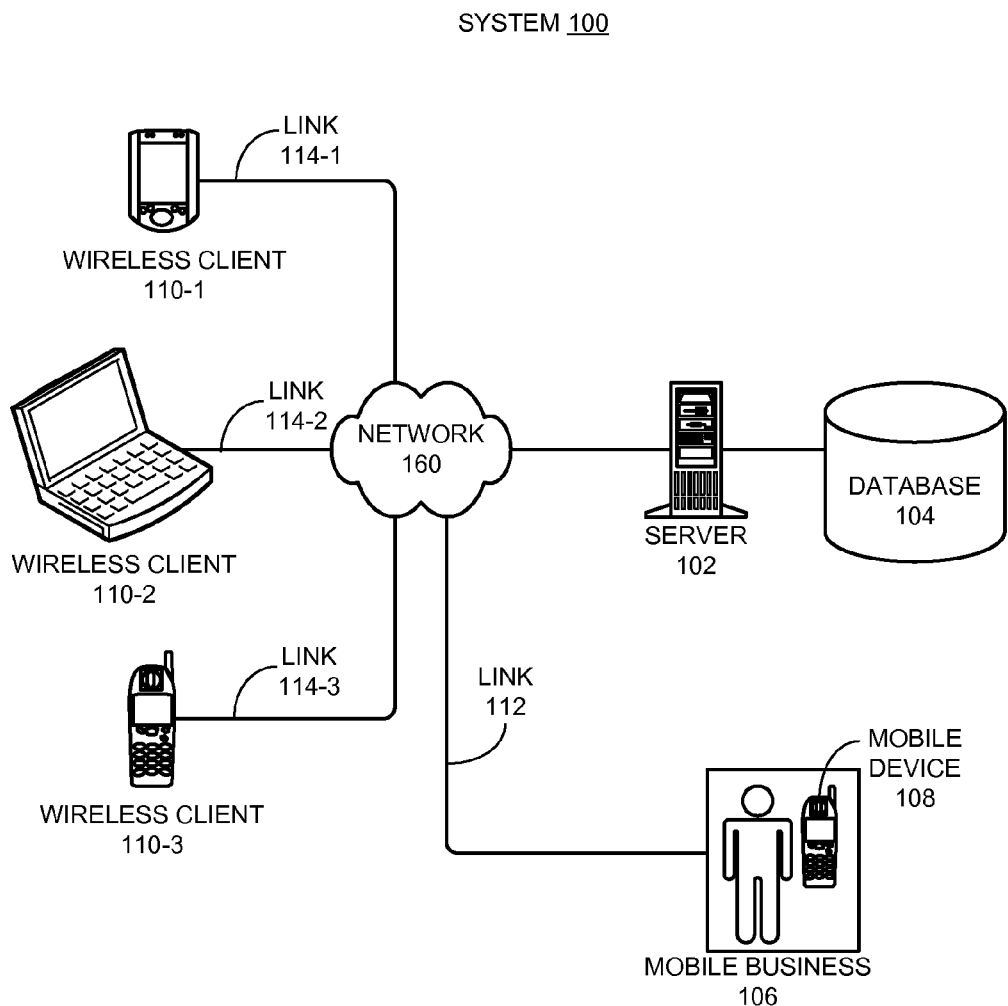
FIG. 1 illustrates a system which dynamically updates geofences for mobile businesses in accordance with some embodiments herein.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

A geofence is a virtual perimeter for a real-world object, such as a store or a location. Existing implementations of geofences and places tend to be static and fixed in location. However, some real world objects, such as a mobile food truck, a kiosk, or any other moving business can change their location from place to place. For example, a mobile food truck may be positioned at different spots around a city during a business day. Hence, it is desirable for clients to keep track of the movement and location of the mobile food truck, and to be alerted when the clients enter/leave the geofence of the mobile food truck, or vice versa. Unfortunately, the existing implementations of geofences fail to address such mobile businesses that do not have a fixed location.

The disclosed embodiments provide a method and system for dynamically updating a geofence of a mobile business/vendor. Using a combination of server-side processing and a unique client-side application, the geofence of the mobile business is constantly updated as its coordinates vary with the movement of the mobile business. In particular embodiments, after the mobile business initially registers its location and geofence with the server, a mobile device associated with the mobile business detects a change of location of the mobile business from an old location to a new location. The mobile device subsequently transmits the new location of the mobile business and optionally transmits attribute information associated with the new location to the server. The server then generates an updated geofence for the mobile business based on the new location of the mobile business, and subsequently broadcasts the new location of the mobile business to a set of mobile clients monitoring the mobile business. In some embodiments, the server is also configured to predict an estimated time of arrival (ETA) of the mobile business at a new location before the mobile business arrives at the new location. The server then notifies the set of mobile clients of the ETA of the mobile business at the new location.

Note that the application layers built upon the proposed techniques can remain unchanged, i.e., they still notify clients as they move in and out of geofences, while the underlying framework takes care of the dynamic update of the geofences.

FIG. 1 illustrates a system 100 which dynamically updates geofences for mobile businesses in accordance with some embodiments herein. As shown in FIG. 1, system 100 may include a geofence placement server 102 ("server 102" hereinafter) which manages geofence registrations and updates, and provides geofence-based services for a set of mobile businesses. In some embodiments, the geofence-based services may include geofence registrations, geofence attributes processing, location updates, location predictions, and scheduling. In one embodiment, server 102 is an Intuit™ API server. System 100 may include a database 104 coupled to server 102 for storing geofence registration information, coordinates and attributes associated with the geofences.

System 100 also includes a mobile business 106. Note that mobile business 106 can include any business that may change its location over time, such as a mobile kiosk, a food truck, a mobile office, a mobile vendor, flea market, among others. Mobile business 106 uses a mobile device 108 to detect and update location changes of mobile business 106. Note that mobile device 108 can be equipped with one or more of the following location-detection capabilities: (1) a cellular-based location-detection capability; (2) a Wi-Fi-based location-detection capability; (3) a GPS; and (4) other location-detection capabilities. Mobile business 106 may be equipped with a business-side mobile application or web application which is used to register mobile business 106 to server 102, and to update the current location to server 102. The business-side mobile application or web application may be configured to set up the geofence that defines the radius which mobile business 106 wants to notify a potential client when the mobile business is currently within an area monitored by the potential client. Note that this monitored area of the potential client can be much larger than the geofence of mobile business 106.

System 100 further includes a plurality of mobile/wireless clients 110-1 to 110-3 ("wireless client(s)" hereinafter). Note that wireless clients 110 can include laptop computers, tablet computers, portable media players, smartphones, and/or other modern computing devices equipped with wireless capabilities. Each wireless client 110 may be installed with a client-side mobile application or web application, which is used to check-in and check-out with server 102, to notify its current location to server 102, and to query server 102 whether there is any geofence within a monitored area of wireless client 110. In some embodiments, the client-side mobile application or web application is at least running in the background on wireless clients 110 to receive notifications and updates as their location changes relative to mobile business 106. The notifications and updates received by wireless clients 110 are dynamic and can be configured to best fit the local context by taking into account such factors as location and time, among other factors.

Note that server 102, mobile business 106, and wireless clients 110 are intercoupled through network 160, which can include any type of wired or wireless communication channel capable of coupling together computing nodes. This includes, but is not limited to, a local area network, a wide area network, or a combination of networks. In one embodiment of the present invention, network 160 includes the Internet. In some embodiments, network 160 includes phone and cellular phone networks.

More specifically, server 102 and mobile business 106 are coupled through a bi-directional wireless link 112. Through link 112, mobile business 106 can update its location and attributes to server 102, and can receive updates from checked-in wireless clients. Server 102 and wireless clients 110-1 to 110-3 are coupled through a set of bi-directional wireless links 114-1 to 114-3. Through each bi-directional link 114, a respective wireless client 110 can update check-in/check-out status and current location to server 102, and can receive dynamic geofence updates and attributes associated with mobile business 106 from server 102. Moreover, each wireless client 110 can receive alerts from server 102 when wireless client 110 is approaching or departing from the geofence of mobile business 106. Note that wireless client 110 entering and exiting the geofence of mobile business 106 can be a result of one or both of the movement of the wireless client and the movement of mobile business 106.

In some embodiments, mobile business 106 may establish itself by registering with server 102, with the business name and location, among other information. The registration process can be managed by the aforementioned business-side mobile application or web application. Upon completing registration, server 102 creates a geofence around mobile business 106, which may be identical to the geofence set up on mobile business 106 by the business-side mobile application or web application. Through the business-side mobile application or web application, mobile business 106 receives alerts from server 102 when any wireless client 110 is entering its geofence, which then triggers business-side actions such as sending out coupons to the client. Note that while system 100 of FIG. 1 illustrates a single mobile business and three wireless clients, the present techniques are applicable to any number of mobile businesses and any number of wireless clients.

In some embodiments, mobile business 106 can detect a change of its location from the current location to a new location and subsequently transmit the new location to server 102 through link 112. Server 102 can update the location for mobile business 106 and also determine an updated geofence for the mobile business 106. Note that mobile business 106 can constantly update its location to server 102 as its coordinates vary, e.g., when mobile business 106 is in the process of traveling. Consequently, server 102 can constantly update the dynamic geofence for mobile business 106 as long as new location updates are being received. In one embodiment, while updating its new location to server 102, mobile business 106 may also send attribute information associated with the new location to server 102.

In some embodiments, server 102 can monitor the location of each wireless client 110, and send notification through link 112 to mobile business 106 when the location is inside the dynamic geofence of mobile business 106. For example, mobile business 106 can receive notification from server 102 of the present of one or more wireless clients 110 within the updated geofence. Mobile business 106 can also receive notification from server 102 when a wireless client 110 enters the updated geofence.

Figure 2:
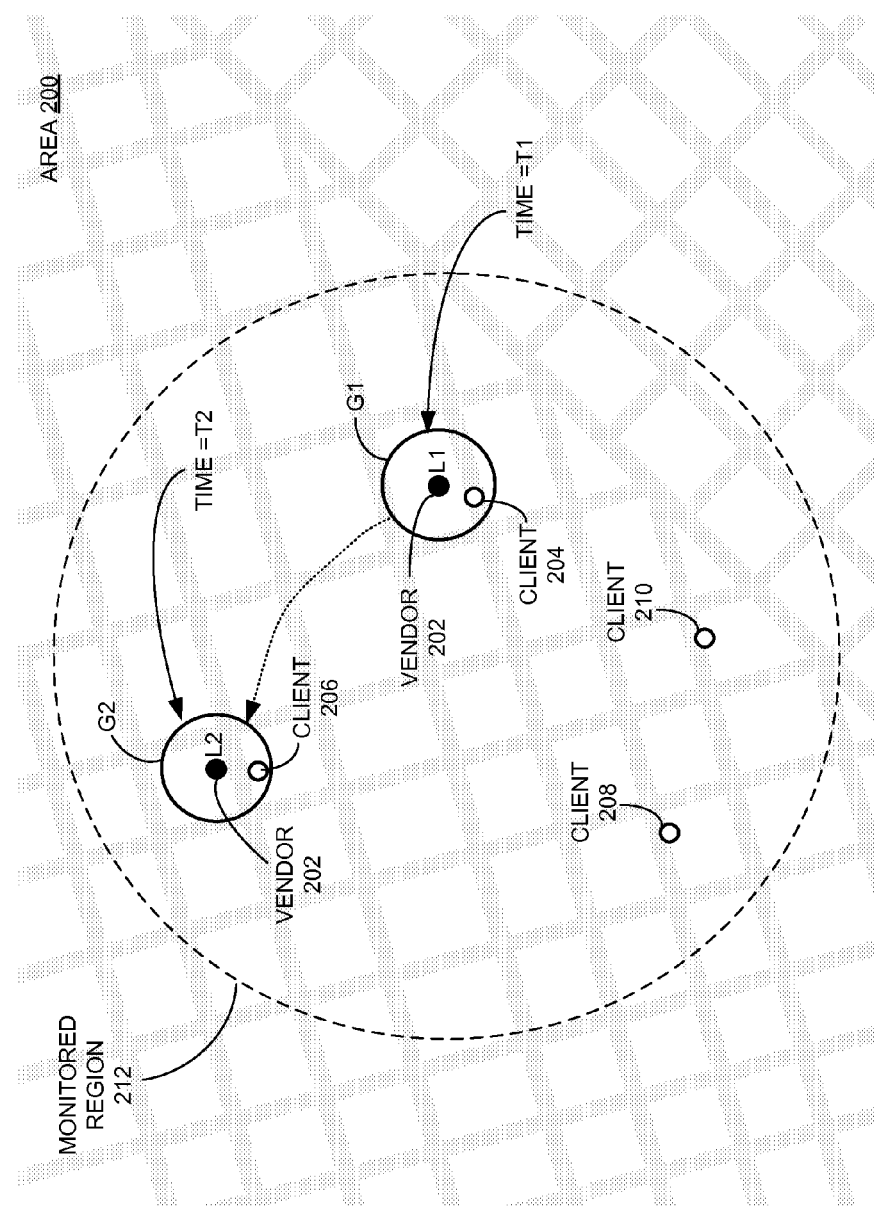
FIG. 2 illustrates an exemplary process of dynamically updating geofences for mobile businesses within a city area in accordance with some embodiments herein.

FIG. 2 illustrates an exemplary process of dynamically updating geofences for mobile businesses within a city area in accordance with some embodiments herein. As can be seen in FIG. 2, a portion of the city area 200 is shown in grey in the background. A mobile vendor 202 with a geofence G1 is initially located at location L1 within area 200 at time T1. Mobile vendor 202 is registered with the server (not shown), which establishes the initial location L1 and the associated geofence G1 for mobile vender 202. Note that while geofence G1 is shown to be a circular area, other embodiments may define a geofence as a different shape, such as a polygon. FIG. 2 also shows four wireless clients 204-210 within area 200 which have already checked in with the server. In particular, wireless client 204 is located within geofence G1 at time T1, whereas wireless clients 206-210 are outside of geofence G1 at time T1.

FIG. 2 additionally illustrates a circular monitored region 212 which represents a client-side geofence wherein a wireless client is willing to search for the mobile business. Note that monitored region 212 is significantly larger than the area of a geofence for a given mobile business. Hence, monitored region 212 can enclose multiple geofences associated with multiple mobile businesses. While only one monitored region is shown, each wireless client can be associated with a unique monitored region. In some embodiments, as a wireless client changes its location, the associated monitored region can also change its coordinates along with that wireless client. In some embodiments, monitored region 212 may be optional.

In one embodiment, a wireless device of mobile vendor 202 is configured to detect whether the location of mobile vendor 202 has changed. More specifically, the wireless device can detect the location change based on one or more of the following signal sources: (1) cellular signals; (2) Wi-Fi signals; and (3) GPS signals. In the example of FIG. 2, the wireless device of mobile vendor 202 would detect the movement of mobile vendor 202 from location L1 to a new location L2 at time T2. After the wireless device detects the change, the new coordinates of mobile vendor 202 are sent to the server. Upon receiving the new coordinates, the server updates mobile vendor 202 with both the new location (L2) and the new geofence (G2). The server can then broadcast the new location and the updated geofence of mobile vendor 202 to "monitoring" wireless clients 204-210. In one embodiment, the server can alert a wireless client when that wireless client enters the updated geofence of mobile vendor 202. For example, the server will alert wireless client 206 when wireless client 206 enters geofence G2 after wireless client 206 arrives at L2. The server will also alert wireless client 206 when wireless client 206 enters geofence G2 as a result of the movement of wireless client 206.

In some embodiments, instead of waiting for mobile vendor 202 to provide its final destination L2, the server can predict the possible end destination and estimated time of arrival (ETA) of the mobile vendor 202. Such predictions may be made based on a number of factors, which can include, but are not limited to: an estimated velocity value of mobile vendor 202, a pattern of movement of mobile vendor 202, and a schedule of mobile vendor 202. For example, the server can determine the velocity of mobile vendor 202 based on an intermediate location between L1 and L2 and the associated time of arrival received from mobile vendor 202. Note that the server can also predict a possible path of movement of mobile vendor 202 based on the initial location L1 and the intermediate location. Next, the server predicts an ETA of mobile vendor 202 at location L2 based on the determined velocity. The server subsequently provides the ETA of mobile vendor 202 at location L2 to wireless clients 204-210 before mobile vendor 202 arrives at L2.

Note that the server can also provide additional attribute information requested by mobile vendor 202 and associated with the new location to wireless clients 204-210. Such attribute information may include, but is not limited to, any or all of the following:

Possible time-sensitive data, for example, limited time "lunch special pricing."

Unique data only available to those wireless clients located within a specific geofence, for example, "those within 100 meters of mobile vendor 202 may get a discount if placing an order within the next 5 minutes."

Because the server maintains the information, more sophisticated marketing options exists, such as the next 10 persons to arrive get a 15% discount, which is easily done since each client 'checks in' to a geofence.

A schedule of the 'next' stops which is dynamically adjusted based on actual movement of mobile vendor 202 to ensure accurate information is passed along to clients.

Figure 3:
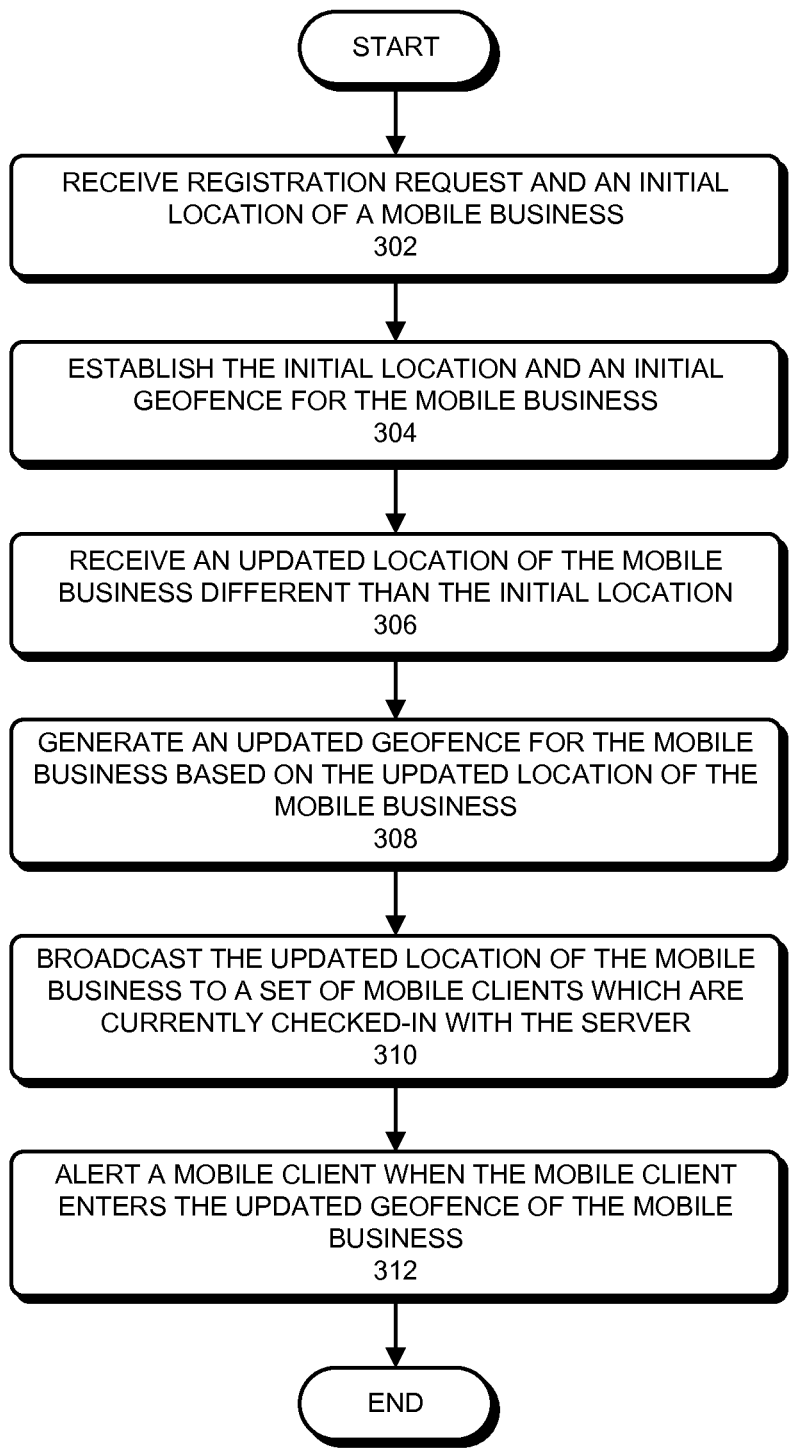
FIG. 3 presents a flowchart illustrating a server-side process for dynamically updating the geofence for a mobile business in accordance with some embodiments herein.

FIG. 3 presents a flowchart illustrating a server-side process for dynamically updating the geofence for a mobile business in accordance with some embodiments herein. During operation, a server receives a registration request and an initial location of a mobile business (step 302). The server subsequently establishes the initial location and an initial geofence for the mobile business (step 304). Next, the server receives an updated location of the mobile business different than the initial location (step 306).

In response, the server generates an updated geofence for the mobile business based on the updated location of the mobile business (step 308). The server then broadcasts the updated location of the mobile business to a set of mobile clients which are currently checked-in with the server (step 310). The server can constantly update the dynamic geofence for the mobile business and notify the set of mobile clients of the updated location of the mobile business as long as new location updates are being received. Note that the server may also broadcast attributes associated with the dynamic geofence of the mobile business to the set of mobile clients. The server also alerts a mobile client when the mobile client enters the updated geofence of the mobile business (step 312).

Figure 4:
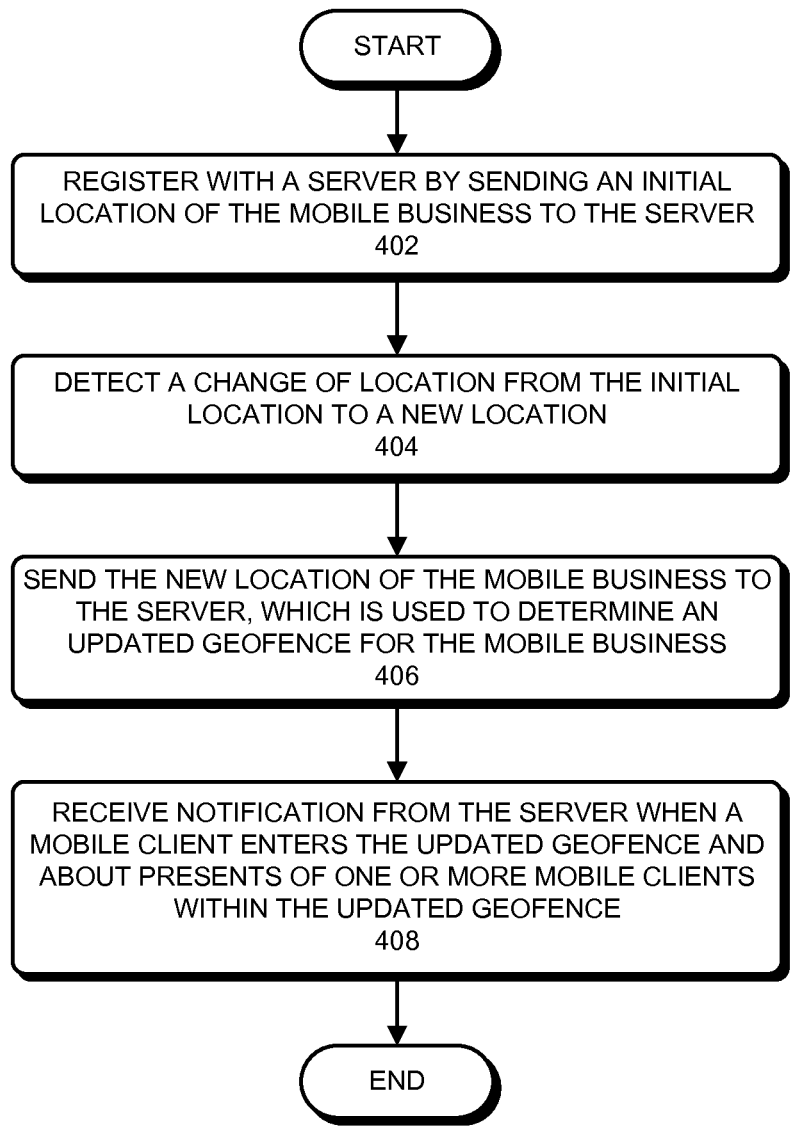
FIG. 4 presents a flowchart illustrating a business-side process for dynamically updating the geofence for a mobile business in accordance with some embodiments herein.

FIG. 4 presents a flowchart illustrating a business-side process for dynamically updating the geofence for a mobile business in accordance with some embodiments herein. During operation, a mobile business registers with a server by sending an initial location of the mobile business to the server (step 402). Note that the initial location of the mobile business is used to determine an initial geofence for the mobile business by the server. Next, the mobile business detects a change of location from the initial location to a new location (step 404).

The mobile business subsequently sends the new location of the mobile business to the server, which is used to determine an updated geofence for the mobile business (step 406). Note that the mobile business can constantly update its location to the server as its coordinates vary, e.g., when the mobile business is in the process of traveling. Note also that while updating its new location to the server, the mobile business may also send attribute information associated with the new location to the server. Next, the mobile business receives notification from the server when a mobile client enters the updated geofence (step 408). The mobile business can also receive notification from the server of the present of one or more mobile clients within the updated geofence (step 408).

Note that dynamic geofences proposed herein not only allow for multiple geofences to be tied to and updated relative to a dynamic location, but also allow for broadcasting specific attribute information tailored to a particular location to nearby clients. As such the proposed dynamic geofence updating process enables extremely accurate local marketing that tailors the message based on current location, time and possibly other factors such as weather, inventory, among other things.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A computer-implemented method for dynamically updating a geofence of a mobile device on a server, comprising:
    establishing a first location and a first geofence for a mobile business device;
    receiving a second location of the mobile business device different than the first location of the mobile business device;
    generating an updated geofence for the mobile business device based on the second location of the mobile business device; and
    predicting an estimated time of arrival (ETA) of the mobile business device at a third location based at least on the second location; and
    notifying a set of one or more mobile client devices of the ETA of the mobile business device at the third location.

2. The computer-implemented method of claim 1, wherein the method further comprises broadcasting the second location of the mobile business device to the set of one or more mobile client devices.

3. The computer-implemented method of claim 1, wherein predicting the ETA of the mobile business device at the third location based at least on the second location can include one or more of:
    determining a velocity of the mobile business device based at least on the second location; and
    determining a pattern of movement of the mobile business device based at least on the second location.

4. The computer-implemented method of claim 1, wherein the method further comprises alerting a mobile client device when the mobile client device enters the updated geofence of the mobile business device.

5. The computer-implemented method of claim 1, wherein prior to establishing the first location and the first geofence, the method further comprises registering the mobile business device.

6. The computer-implemented method of claim 5, wherein registering the mobile business device involves using either a business-side mobile application or a business-side web application.

7. The computer-implemented method of claim 1, wherein the method further comprises alerting the mobile business device when a mobile client device enters the updated geofence.

8. The computer-implemented method of claim 1, wherein the method further comprises predicting a path of the mobile business device based at least on the first location and the second location.

9. A computer-implemented method for dynamically updating a geofence of a mobile device to a server, comprising:
    registering with a server by sending a first location of the mobile business device to the server, wherein the first location is used to determine a first geofence for the mobile business device;
    detecting, using the mobile business device, a change of location of the mobile business device from the first location to a second location;
    sending the second location of the mobile business device to the server, which is used to determine an updated geofence for the mobile business device from the first geofence; and
    receiving a notification from the server when a mobile client device enters the updated geofence of the mobile business device.

10. The computer-implemented method of claim 9, wherein while sending the second location of the mobile business device, the method further comprises sending attribute information associated with the second location to the server.

11. The computer-implemented method of claim 9, wherein the method further comprises receiving notification from the server of the presence of one or more mobile client devices within the updated geofence of the mobile business device.

12. A computer-readable storage medium storing instructions that when executed by a computer cause the computer to perform a method for dynamically updating a geofence of a mobile business device on a server, the method comprising:
    establishing a first location and a first geofence for a mobile business device;
    receiving a second location of the mobile business device different than the first location of the mobile business device;
    generating an updated geofence for the mobile business device based on the second location of the mobile business device;
    predicting an estimated time of arrival (ETA) of the mobile business device at a third location based at least on the second location; and
    notifying the set of one or more mobile client devices of the ETA of the mobile business device at the third location.

13. The computer-readable storage medium of claim 12, wherein the method further comprises broadcasting the second location of the mobile business device to a set of mobile client devices.

14. The computer-readable storage medium of claim 12, wherein predicting the ETA of the mobile business device at the third location based at least on the second location can include one or more of:
   determining a velocity of the mobile business device based at least on the second location; and
   determining a pattern of movement of the mobile business device based at least on the second location.

15. The computer-readable storage medium of claim 12, wherein the method further comprises alerting a mobile client device when the mobile client device enters the updated geofence of the mobile business device.

16. The computer-readable storage medium of claim 12, wherein prior to establishing the first location and the first geofence, the method further comprises registering the mobile business device.

17. The computer-readable storage medium of claim 14, wherein registering the mobile business device involves using either a business-side mobile application or a business-side web application.

18. The computer-readable storage medium of claim 12, wherein the method further comprises alerting the mobile business device when a mobile client enters the updated geofence of the mobile business device.

19. The computer-readable storage medium of claim 12, wherein the method further comprises predicting a path of the mobile business device based at least on the first location and the second location.

20. A computer-readable storage medium storing instructions that when executed by a computer cause the computer to perform a method for dynamically updating a geofence of a mobile business device to a server, the method comprising:
   registering with a server by sending a first location of the mobile business device to the server, wherein the first location is used to determine a first geofence for the mobile business device;
   detecting a change of location of the mobile business device from the first location to a second location;
   sending the second location of the mobile business device to the server, which is used to determine an updated geofence for the mobile business device from the first geofence; and
   receiving a notification from the server when a mobile client device enters the updated geofence of the mobile business device.

21. The computer-readable storage medium of claim 20, wherein while sending the second location of the mobile business device, the method further comprises sending attribute information associated with the second location to the server.

22. The computer-readable storage medium of claim 20, wherein the method further comprises receiving notification from the server of the present of one or more mobile client devices within the updated geofence of the mobile business device.

23. A system for dynamically updating a geofence of a mobile business device, comprising:
   a server device; and
   a mobile business device coupled to the server device, which is configured to:
      register with a server by sending a first location of the mobile business device to the server;
      detect a change of location of the mobile business device from the first location to a second location; and
      send the second location of the mobile business device to the server device; and
   wherein the server device is configured to:
      establish the first geofence for the mobile business device based on the first location;
      receive the second location of the mobile business device;
      generate an updated geofence for the mobile business device based on the second location of the mobile business device;
      predict an estimated time of arrival (ETA) of the mobile business device at a third location based at least on the second location; and
      notify the set of one or more mobile client devices of the ETA of the mobile business device at the third location.

* * * * *